(12) United States Patent
Lai

(10) Patent No.: US 6,827,173 B2
(45) Date of Patent: Dec. 7, 2004

(54) EXHAUST SYSTEM HAVING A TAIL PIPE ARRANGEMENT AND METHOD OF MAKING SAME

(75) Inventor: Pinky Lai, Koenigsbach-Stein (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 21 days.

(21) Appl. No.: 10/222,988

(22) Filed: Aug. 19, 2002

(65) Prior Publication Data

US 2003/0057008 A1 Mar. 27, 2003

(30) Foreign Application Priority Data

Aug. 17, 2001 (DE) .......................................... 101 40 435

(51) Int. Cl.⁷ .............................................. B60K 13/04
(52) U.S. Cl. ..................... 180/309; 180/296; 180/89.2; 293/113
(58) Field of Search ................................ 180/296, 309, 180/89.2; 60/272; 293/113; F01N 7/20; B60K 13/04

(56) References Cited

U.S. PATENT DOCUMENTS

| | | | | |
|---|---|---|---|---|
| 2,841,232 A | * | 7/1958 | Loeffler ...................... 180/89.2 |
| 2,992,035 A | * | 7/1961 | Tell et al. ..................... 293/113 |
| 3,666,037 A | | 5/1972 | Otto |
| 4,465,154 A | * | 8/1984 | Hinderks ................... 180/89.2 |
| 5,464,952 A | | 11/1995 | Shah et al. |
| 5,466,900 A | * | 11/1995 | Knapp ......................... 181/227 |
| 5,831,223 A | * | 11/1998 | Kesselring .................. 181/227 |
| 5,996,730 A | * | 12/1999 | Pirchl ......................... 181/211 |
| 6,141,958 A | * | 11/2000 | Voss ............................. 60/272 |
| 6,595,318 B2 | * | 7/2003 | Ebinger et al. ............. 181/227 |

FOREIGN PATENT DOCUMENTS

| | | | |
|---|---|---|---|
| DE | 355786 | 7/1922 | |
| DE | 1 948 939 | 1/1974 | |
| DE | G 87 16 385.3 | 4/1988 | |
| DE | 198 28 167 | 1/1999 | |
| DE | 100 01 224 | 7/2001 | |
| EP | 0 848 144 | 6/1998 | |
| EP | 848144 A1 * | 6/1998 | ............. F01N/7/20 |

* cited by examiner

Primary Examiner—Christopher P. Ellis
Assistant Examiner—Kelly E Campbell
(74) Attorney, Agent, or Firm—Crowell & Moring LLP

(57) ABSTRACT

An exhaust system provided with a tail pipe arrangement which extends adjacent to a wall part of a body of a motor vehicle, so that the exhaust system or the tail pipe arrangement, on the one hand, has sufficient space for relative movements and, on the other hand, is integrated in the visible dimensional structure of the vehicle body, viewed in the driving direction, the tail pipe arrangement is situated by a free end in front of the wall part, and, viewed from the rearward side of the motor vehicle upon the tail pipe arrangement, a first countour of an end area of the wall part corresponds basically at least in sections with an exterior second contour of the tail pipe arrangement.

3 Claims, 3 Drawing Sheets

US 6,827,173 B2

EXHAUST SYSTEM HAVING A TAIL PIPE ARRANGEMENT AND METHOD OF MAKING SAME

BACKGROUND AND SUMMARY OF THE INVENTION

This application claims the priority of German Patent Document 101 40 435.2, filed on Aug. 17, 2001, the disclosure of which is expressly incorporated by reference herein.

The invention relates to an exhaust system having a tail pipe arrangement which extends adjacent to a wall part of a body of a motor vehicle.

A known exhaust system for a motor vehicle, as in European Patent Document EP 0 848144 A1, has an exhaust pipe whose free end is provided with a tail pipe arrangement. The tail pipe arrangement has a double-walled construction, for which an interior shell and an exterior shell are provided. The interior shell and the exterior shell are arranged with respect to one another such that an air gap or a ring duct is formed. At the rearward end of the tail pipe arrangement, the ring duct is closed; it is open at the forward end. As a result, a targeted heat dissipation is achieved at the tail pipe arrangement.

From German Patent Document DE 1 948 939 and corresponding U.S. Pat. No. 3,666,037, an end piece is known for the exhaust pipe of a motor vehicle driven by an internal-combustion engine, which end piece extends at a distance from a transversely extending vehicle body wall. This distance is required so that, during the operation of the internal-combustion engine, the end piece can carry out relative movements with respect to the vehicle body wall. However, this design makes the formal integration of the end piece into the adjacent vehicle body wall more difficult.

U.S. Patent Document U.S. Pat. No. 2,992,035 relates to such an integration and reflects a tail pipe arrangement of an exhaust system of a motor vehicle, which tail pipe arrangement, viewed in the driving direction, is surrounded in front of the bumper by such a funnel-type pipe extension such that the tail pipe arrangement is movably disposed relative to the pipe extension. By means of its rearward end, the pipe extension penetrates an opening in a wall of the bumper and is therefore constructionally and visually combined with the bumper. This construction has the disadvantage that the bearing of the tail pipe arrangement and the pipe extension, including its integration in the bumper, cause relatively high constructional expenditures.

An aspect of the invention is to provide a tail pipe arrangement for an exhaust system of a motor vehicle which, on the one hand, is correspondingly disposed with respect to the required relative movements and, on the other hand, is integrated in the dimensional structure of a body of the motor vehicle. However, in this case, it should be ensured that the heat in the area of the tail pipe arrangement does not damage adjoining wall parts of the vehicle body.

According to certain preferred embodiments of the invention, this aspect is achieved in that viewed in a driving direction of the motor vehicle, the tail pipe arrangement is situated by way of a first fee end in front of the wall part of the vehicle body, and, viewed from a rearward side of the motor vehicle upon the tail pipe arrangement, a first contour of a lower end area of the wall part corresponds at least in sections basically with an outer second contour of the tail pipe arrangement. Additional characteristics advantageously developing the invention are described below.

Some principal advantages achieved by way of certain preferred embodiments of the invention are that the tail pipe arrangement of the exhaust system forms a formal unit with the adjacent wall part of the vehicle body which also optimizes the appearance of the motor vehicle without being impaired thereby with respect to the relative movements occurring during the operation of the internal-combustion engine of the motor vehicle. As a result, it is achieved that, viewed in the driving direction, the tail pipe arrangement is situated with its free or rearward end in front of the wall part of the vehicle body, and an end section of the wall part, which faces the tail pipe arrangement, basically corresponds with an outer contour of the above-mentioned tail pipe arrangement. The wall part may be formed by a panel which may be inserted into a rear covering consisting of a plastic material. In order to protect the rear covering from high-temperature exhaust gas flows, the panel is constructed as a heat shield. Finally, the screen, which may be painted or chromium-plated, is an easily producible component and can easily be connected with the rear covering.

Other objects, advantages and novel features of the present invention will become apparent from the following detailed description of the invention when considered in conjunction with the accompanying drawings.

DETAILED DESCRIPTION OF THE DRAWINGS

Figure 1:
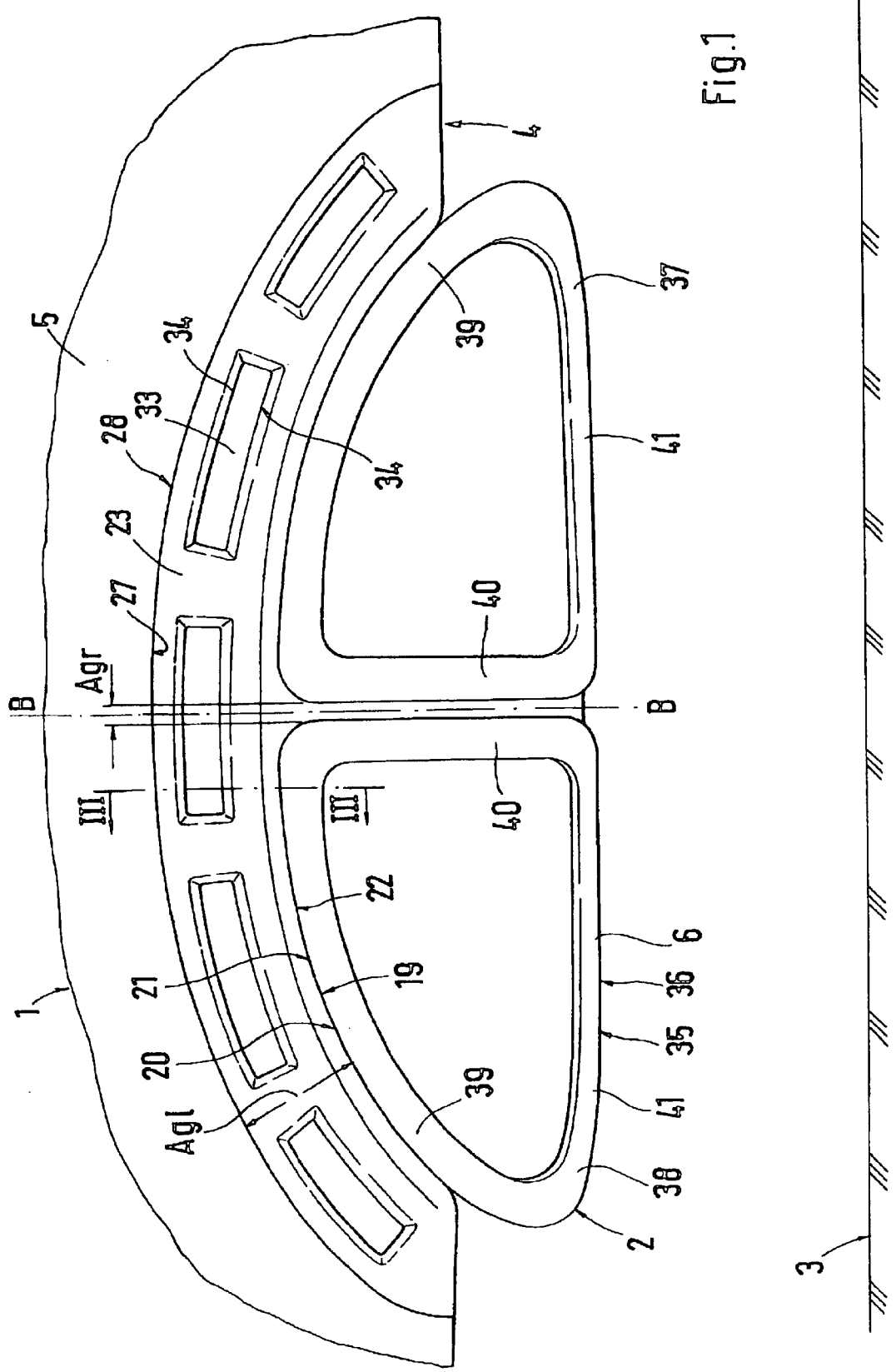
FIG. 1 shows a rear view of an exhaust system of a motor vehicle driven by an internal-combustion engine.
Figure 2:
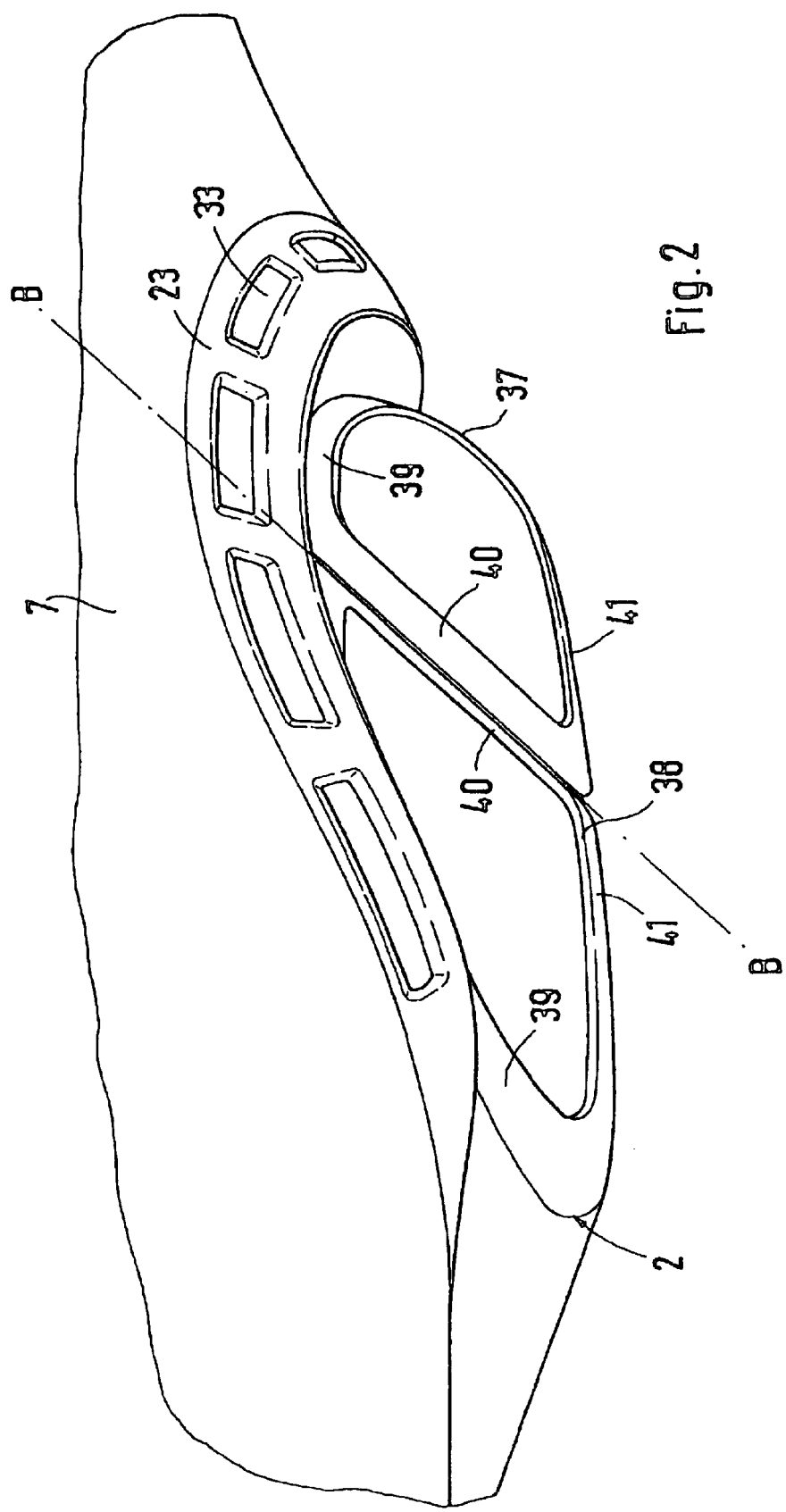
FIG. 2 shows a diagonal view from the rear left showing the exhaust system.

A motor vehicle 1, which is illustrated only in regions, is driven by a multi-cylinder internal-combustion, for example, with opposed cylinder rows, the latter not being shown. After a catalytic purification, the gas flow leaving the internal-combustion engine reaches the atmosphere by way of an exhaust system 2. The relatively movably disposed exhaust system 2—arrows RI-RII and RIII-IV—which faces a road 3, is provided with a tail pipe arrangement 6 adjacent to a wall part 4 of a vehicle body 5, the wall part 4 being a component of a rear covering 7 which may be made, for example, of a suitable plastic material.

The tail pipe arrangement 6 surrounding an end section 8 of an exhaust pipe 9 of the exhaust system 2 has a double-walled construction and is formed by an interior part 10 and an exterior part 11. Reference is made for this purpose to the initially mentioned European Patent Document EP 0 848144 A1.

On a first free end 12 of the tail pipe arrangement 6, the interior part 10 and the exterior part 11 are closed such that an annulus 13 is formed. At a second end 14, which extends at a distance to the first end 12, the annulus 13 is open, whereby a targeted dissipation is achieved of the heat generated by the gas flow.

Figure 3:
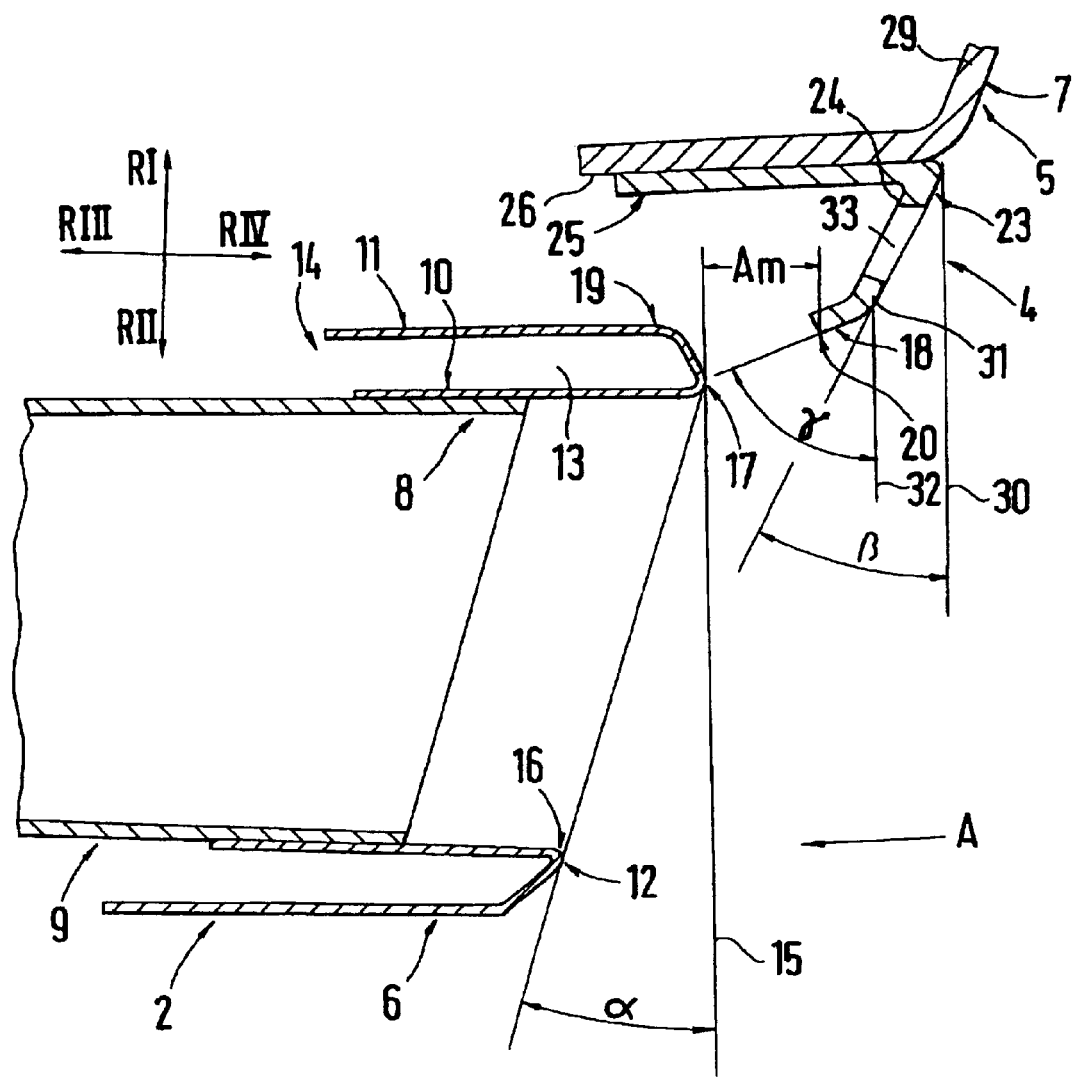
FIG. 3 shows an enlarged sectional view according to Line III—III of FIG. 1.

The first end 12 of the tail pipe arrangement 6 extends at an angle α with respect to a first vertical line 15, in which case, this end 12—viewed in the driving direction A—is situated by way of a lower end section 16 in front of an upper end section 17. Furthermore, viewed in the driving direction A, the upper end section 17 of the end 12 is situated in front of a lower end area 18 of the wall part 4, which is illustrated by the distance measurement Am in FIG. 3. However, a first contour 19 of the end area 17 corresponds with a second contour 20 of the lower end area 18 of the wall part 4, as seen in FIG. 1. The second contour 20 is constructed as a convex curve 21; the first contour 19 is constructed as a concave curve 22. The curves 21, 22 extend symmetrically with respect to a vertical longitudinal center plane B—B of the tail pipe arrangement 6, as in FIG. 1.

The wall part 4 is constructed as a panel 23 integrated in the rear covering 7, which panel 23 is made of metal, ceramics or the like and is constructed as a heat shield for the rear covering. The panel 23 has an angular profile with legs 24, 25. Leg 24 is arranged in a relatively upright manner. Leg 25 is horizontal. Leg 25 extends parallel to a flange 26 of the rear covering 7 and is held thereon by way of corresponding devices. The leg 25 describes a convex curve 27. The flange 26 describes a concave curve 28. The convex curve 27 and the concave curve 20 extend at an identical distance AgL with respect to one another. In addition, the leg 24 forms a continuation of the rear covering 7 and of an upright end wall 29, respectively. The leg 24 is arranged at an angle β with respect to a second perpendicular line 30. A lower edge 31 of the leg 24 is arranged at an angle γ with respect to a third perpendicular line 32 such that the leg 24 and the lower edge 31 point in the driving direction A.

In the upright leg 24, several passage openings 33 are provided which are used for the ventilation and which are constructed as rectangles in the embodiment shown, in which case the longer sides 34 of the passage openings 33 follow the curves 21 and 27. However, it is also possible to construct the passage openings in square, circular or similar shapes.

A special design conception is achieved when the tail pipe arrangement 6 is bounded on the side 35 facing away from the curve 22 by a plane 36 which extends perpendicular to the longitudinal center plane B-B or parallel to the road 3 and comprises double pipes 37, 38 which extend on both sides of the above-mentioned longitudinal center plane B-B at a relatively small distance Agr with respect to one another. Viewed from the rearward side of the motor vehicle 1, each double pipe 37 and 38 has approximately the shape of a triangle which is formed by a first curved side 39, a second perpendicular side 40 and a third horizontal side 41 of the planes 36.

Finally, a particularly aesthetic effect can be achieved when the panel 23 and the rear covering 7 are painted the same color or the panel 23 and the tail pipe arrangement 6 have a high-gloss coating on the visible side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Exhaust system comprising a tail pipe arrangement which extends adjacent to a wall part of a body of a motor vehicle, wherein, in a longitudinal direction of the motor vehicle, a first free end of the tail pipe arrangement is situated ahead of the wall part of the vehicle body, and a first contour of a lower end area of the wall part adjacent to the first free end of the tail pipe corresponds at least in sections with an upper portion of a second contour of the first free end of the tail pipe arrangement, wherein the wall part is formed by a panel which is connected to a rear covering of the vehicle body made of a plastic material, wherein the panel has an angular cross-section and by way of an approximately horizontally extending first leg extends to a flange of the rear covering extending parallel thereto, wherein a second upright extending leg of the panel forms a continuation of a correspondingly aligned upright end wall of the rear covering, and wherein at least one passage opening used for ventilation is provided in the second upright leg of the panel.

2. Exhaust system according to claim 1, wherein the passage opening is a rectangle whose longer sides follow the direction of the curves.

3. Exhaust system according to claim 1, wherein the tail pipe arrangement comprises double pipes which extend on both sides of a vertical longitudinal center plane of the first free end of the tail pipe arrangement near one another.

* * * * *